Patented Apr. 8, 1930

1,753,659

UNITED STATES PATENT OFFICE

VAMAN R. KOKATNUR, OF NEW YORK, N. Y.

ANHYDROUS SOAP GELS AND METHOD OF MAKING SAME

No Drawing. Application filed May 13, 1926. Serial No. 108,985.

This invention relates in general to soap products in which a soap and an organic non-hydroxylic diluent are associated in the form of a gel. More particularly, the invention provides a gel of this character, which is substantially anhydrous and which may contain much greater percentages of diluent than gelled soap products, which have heretofore been produced. Hydrocarbon or naphtha soaps and various dry cleaning soaps have heretofore been made by incorporating soap solutions in non-hydroxylic solvents such as gasoline, benzol, carbon tetrachloride and the like, but such gels contain as a rule only limited amounts of such diluents ranging from 10 to 20% of the weight of soap. Furthermore, the method of making them involves the use of prepared soap and water in one form or another, which remains in the final product. So far as I am aware, however, anhydrous organic soap gels, though desirable, have never been made or used in the arts.

I have found that anhydrous hydrocarbon soaps or soap gels can be made by conducting the saponification of fats dissolved in non-hydroxylic and inert diluents with solid, powdered and substantially anhydrous alkaline agents, such as caustic soda. Such a saponification step is described in my prior U. S. application Serial No. 25,459, filed April 23, 1925. The saponification of a fat in the manner described does not produce an equivalent of water as one of the products of the reaction, since such a saponification is a mere replacement of the alcoholic component (usually glycerine). Water may or may not be used during saponification, but in any case in which it is employed, it is substantially all removed before gelling sets in. By conducting the saponification in accordance with my improved method, almost any non-hydroxylic diluent can be incorporated with the soap within a very wide range of proportions. It is important in my process that the diluent be a non-solvent of the soap and chemically inert with respect to the soap.

As diluents, I may employ for example (1) any petroleum fractions, for example, benzine, kerosene and lubricating oils; (2) aromatic hydrocarbons, for example, benzol, solvent naphtha, naphthalene, anthracene, tar and asphalt; (3) chlorinated compounds, for example, carbon, tetrachloride, chlor-benzol and chlor-naphthalenes; (4) heterocyclic compounds, for example, pyridine, quinoline; (5) amino compounds, for example, aniline, naphthylamine; (6) nitro compounds, for example, nitro benzol; (7) ketones, for example, acetophenone, benzophenone; and (8) mustard oils and sulphides such as phenylsulphide.

I may briefly describe the general principles of the method of producing the gel as follows:—A suitable fat is dissolved in a diluent of the character mentioned and subjected to the saponifying action of, for example, caustic soda, which may be introduced into the solution of fat in a substantially dry powdered form. These ingredients are then heated to the temperature of saponification. In the saponification, glycerine is set free from the fat and the soap is formed. When allowed to cool, the mass containing the soap, the diluent and the glycerine, assumes the form of a tough gel.

To more clearly illustrate the procedure and principles involved, I shall refer to several examples:—

*Example I (high boiling diluent)*

One hundred pounds of any animal or vegetable fat or their mixture, is dissolved in about 250 or more pounds of high-flash mineral oil such as high-flash and high-boiling petroleum oils or any motor oil, in an open kettle fitted with an agitator. To this are then added about 14 lbs. of powdered or flake caustic soda. The kettle is then heated in any convenient manner and agitated continuously during the entire saponification. The operation is continued until after all the particles of caustic soda are dissolved and the contents of the kettle assume a homogeneous appearance. Care should be taken that the temperature of this homogeneous mass preferably stays below 200° C. In any event, the temperature should not be allowed to rise beyond the decomposition point of any one of the ingredients—here 290°, the boiling and decomposing point of glycerine. When the mass is homogeneous, the agitation is stopped and the mass allowed to cool. On cooling, the mass sets to a tough gel. This soap gel is light yellow to brownish in color, stiff, somewhat elastic, non-bleeding and contains the soap, glycerine, and diluent, but is free from water. Such gels are useful as lubricating soap-greases and due to the absence of water and its hydrolyzing action on soap, have no chemical action on metal surfaces. In this example, I may substitute other bases for caustic soda or may incorporate graphite, soapstone, etc. along with the soap. I may also change the proportion of fat to oil in any desired manner.

Example II (low boiling diluent)

In a kettle fitted up with an agitator and a reflex condenser, 100 lbs. of any fat dissolved in 200–300 lbs. of benzine are placed and to it about 14 lbs. of powdered or flake caustic soda, are added. The mixed materials are now heated with agitation to the boiling point of benzine, taking care that the reflex condenser returns all the vaporized benzine to the kettle. The heating is continued until after the kettle-contents assume a homogeneous appearance, which takes about two hours. The agitation is now stopped and the mass allowed to cool and congeal. The benzine-gel contains soap, gylcerine and diluent, and when cold is almost white and looks like gelatine. This gel dissolves in water without separating benzine and has fine detergent properties. It can be used as a dry-cleaning soap, solidified benzine-fuel or a house hold animal-fibre cleansing soap. Wool or silk boiled in a water solution of this soap is neither shrunk nor weak in tensile strength. It is an admirable household soap and does not deleteriously affect the most delicate fibres. It leaves no odor of benzine.

Example III (low boiling diluent)

This is a modification of Example II. The apparatus consists of an agitated kettle with a still-head and condenser attachment. The benzine used is somewhat larger in quantity say 400–500 lbs. Instead of substantially dry solid caustic, an aqueous solution of caustic of any strength is used. During saponification, about 100–200 lbs. of benzine are distilled until its vapors have carried away and removed all the water introduced in the reaction, by the principle of partial-pressure distillation as described in my copending application above mentioned. On cooling, the soap gel obtained is substantially the same as in Example II.

Example IV (medium boiling diluent)

The apparatus is the same as in Example III. The fat and caustic alkali are used in the same proportion. Instead of benzine, any petroleum fraction or a non-hydroxylic inert diluent boiling between 170–200° C. is preferably used. About 125 lbs. of this diluent are needed to remove about 9 lbs. of glycerine liberated during the saponification. So the quantity of the diluent used should be 125 plus what is desired to be retained in the final gel soap. Thus, if 200 lbs. of this diluent are desired to be retained with the soap, 325–350 lbs. of the diluent should be used. All the glycerine is removed during the saponification, by distilling it at its partial pressure and mixed with the diluent vapors. After the removal of glycerine, the homogeneous liquid in the still is allowed to cool and congeal, when it gives a light yellow, glycerine-free, anhydrous petroleum-soap or gel. These can be used with advantage for purposes for which naphtha, hydrocarbon, or other soaps are used in the art.

If the soap-gel in Example IV is desired to be transparent, any alcoholic compound in a hot state can be introduced in the still and while the still-contents are still warm and molten and before the gellification has set in. On cooling a transparent gel, containing alcohol, is obtained.

Transparent soap-gels in other examples can be made by incorporating with the fat and the diluent, the required quantity of any alcohol or glycerine and saponifying afterwards. Only care should be taken when an ordinary still or an open kettle is used, to conduct the saponification at a temperature at which the combined partial pressures of the alcoholic ingredient and the diluent do not reach the atmospheric pressure. If a reflex condenser is used, this precaution is unnecessary.

Thus in Example I, if additional glycerine is used, no further precaution is necessary. If, however, ethyl alcohol is used, a reflex condenser will be necessary.

In Example II, no further precaution is necessary, no matter what alcohol is used.

In Example III, if glycerine is used, no further precaution is necessary. If, however, ethyl alcohol is used, it should be introduced in the still after the removal of water by benzine distillation.

The diluent employed under the principles of my invention may be selected with reference to a particular function which it may be called upon to perform in the use of the soap gel. For example, gasolene or kerosene soap gels may be dissolved in water and used as insecticidal sprays. The same soap gel can be used as a textile soap for scouring purposes and to remove waxy material from raw wool, silk and cotton. Asphalt and tar gels may be used to advantage as substitutes for asphalt and tar as road materials, on account of their higher melting points. Turpentine gels, and gels incorporating gums, may be employed as polishing soaps on metal, wood, leather and other finished surfaces. High boiling petroleum soap gels may be used as substitutes for candle wax. Gels made from drying oil soaps, and oxidized, provide valuable plastics and plastic bases.

I claim:—

The method of making an anhydrous soap gel which comprises saponifying a glyceride with an anhydrous alkali in a substantially anhydrous non-hydroxylic organic diluent, which is a non-solvent and chemically inert with respect to the soap, and allowing the resulting anhydrous products and the diluent to congeal together.

VAMAN R. KOKATNUR.